(12) United States Patent
Brown et al.

(10) Patent No.: US 6,513,331 B1
(45) Date of Patent: Feb. 4, 2003

(54) PREFERENTIAL MULTIHOLE COMBUSTOR LINER

(75) Inventors: Daniel Dale Brown, Fairfield, OH (US); Gilbert Farmer, Cincinnati, OH (US); Myron Edward Rutherford, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 09/934,182

(22) Filed: Aug. 21, 2001

(51) Int. Cl.[7] ............................................... F02C 3/04
(52) U.S. Cl. ......................................................... 60/754
(58) Field of Search ..................... 60/265, 752 E, 60/754 EG, 755, 756, 804; 431/352

(56) References Cited

U.S. PATENT DOCUMENTS

| | | | |
|---|---|---|---|
| 2,586,751 A | * 2/1952 | Watson | 60/748 |
| 2,692,014 A | 10/1954 | MacCracken | 60/754 |
| 3,623,711 A | 11/1971 | Thorstenson | 263/19 A |
| 4,872,312 A | 10/1989 | Iizuka et al. | 60/760 |
| 5,233,828 A | 8/1993 | Napoli | 60/261 |
| 5,241,827 A | 9/1993 | Lampes | 60/754 |
| 5,850,732 A | * 12/1998 | Willis et al. | 60/804 |
| 6,145,319 A | 11/2000 | Burns et al. | 60/755 |
| 6,205,789 B1 | 3/2001 | Patterson et al. | 60/754 |
| 6,408,629 B1 | 6/2002 | Harris et al. | 60/804 |

* cited by examiner

Primary Examiner—Ehud Gartenberg
(74) Attorney, Agent, or Firm—Rodney M. Young; Pierce Atwood; William Scott Andes

(57) ABSTRACT

A multi-hole cooled combustor liner is provided which reduces hot streaks and associated material distress in the liner. Areas of increased cooling hole density are disposed upstream of the primary dilution holes and in circumferential alignment with fuel cup centers. Additional cooling holes are provided in between primary dilution holes are arranged in alternating pairs of circumferentially angled holes so as to provide a converging cooling air flow in the downstream direction.

6 Claims, 3 Drawing Sheets

PREFERENTIAL MULTIHOLE COMBUSTOR LINER

BACKGROUND OF THE INVENTION

This invention relates generally to film cooled combustor liners for use in gas turbine engines and more particularly to such combustor liners having regions with closely spaced cooling holes.

A gas turbine engine includes a compressor that provides pressurized air to a combustor wherein the air is mixed with fuel and ignited for generating hot combustion gases. The fuel is injected into the combustor through fuel tubes located at uniformly spaced injection points around the combustor. These gases flow downstream to one or more turbines that extract energy therefrom to power the compressor and provide useful work such as powering an aircraft in flight. Combustors used in aircraft engines typically include inner and outer combustor liners to protect the combustor and surrounding engine components from the intense heat generated by the combustion process. A variety of approaches have been proposed to cool combustor liners so as to allow the liners to withstand greater combustion temperatures. One such approach is multi-hole film cooling wherein a thin layer of cooling air is provided along the combustion side of the liners by an array of very small cooling holes formed through the liners. Multi-hole film cooling reduces the overall thermal load on the liners because the mass flow through the cooling holes dilutes the hot combustion gas next to the liner surfaces, and the flow through the holes provides convective cooling of the liner walls.

In the assembled combustor, certain portions of the combustor liners are aligned with the injection points defined by the circumferential location of the center of the fuel tubes. These locations are hereinafter referred to as "cup centers". In operation, the flow of combustion gases past these circumferential locations create "hot streaks" of locally increased material temperatures. The portions of the combustor liners subject-to hot streaks can exhibit oxidation, corrosion and low cycle fatigue (LCF) failures after return from field use.

Accordingly, there is a need for a combustor liner in which cooling film effectiveness is increased in the areas of the liner that are subject to unusually high temperatures and resulting material distress.

BRIEF SUMMARY OF THE INVENTION

The above-mentioned need is met by the present invention, which provides a gas turbine combustor liner made up of a shell having cooling holes formed therein, a group of which are disposed upstream of the dilution holes and divided into two sub-groups. The second sub-group of this group of cooling holes is located in circumferential alignment with a hot streak and are more closely spaced than the cooling holes of the first sub-group. The shell may also have additional cooling hole groups disposed between dilution holes in the liner. The additional groups are arranged so as to provide a converging flow in the circumferential direction to provide enhanced cooling to the area of the liner downstream of the dilution holes.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
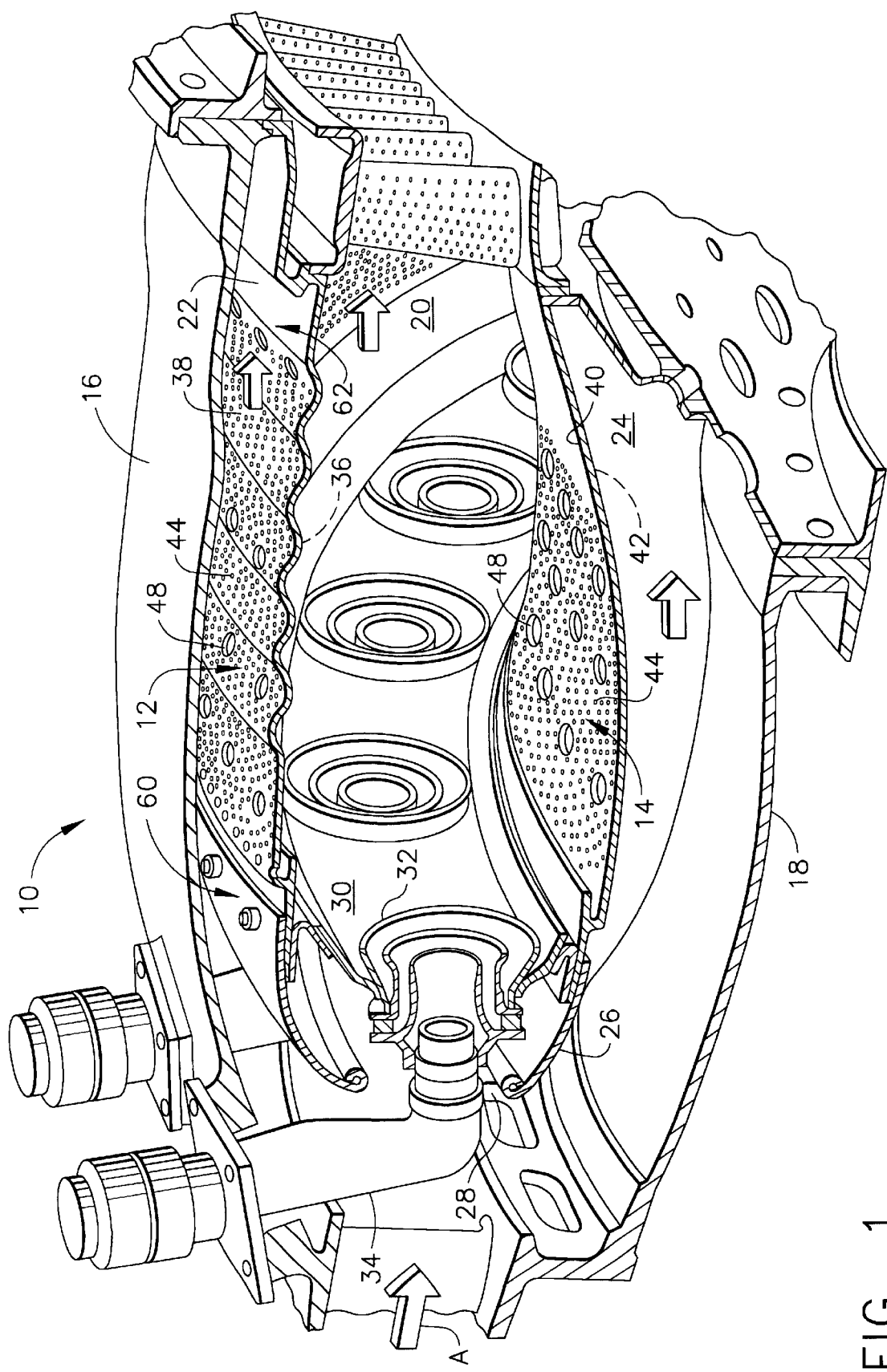
FIG. 1 is a cutaway perspective view of a gas turbine combustor having combustor liners of the present invention.

Referring to the drawings wherein identical reference numerals denote the same elements throughout the various views, FIG. 1 shows a combustor 10 of the type suitable for use in a gas turbine engine. Combustor 10 includes an outer liner 12 and an inner liner 14 disposed between an outer combustor casing 16 and an inner combustor casing 18. Outer and inner liners 12 and 14 are radially spaced from each other to define a combustion chamber 20. Outer liner 12 and outer casing 16 form an outer passage 22 therebetween, and inner liner 14 and inner casing 18 form an inner passage 24 therebetween. A cowl assembly 26 is mounted to the upstream ends of outer and inner liners 12 and 14. An annular opening 28 is formed in cowl assembly 26 for the introduction of compressed air into combustor 10. The compressed air is supplied from a compressor (not shown) in a direction generally indicated by arrow A of FIG. 1. The compressed air passes principally through annular opening 28 to support combustion and partially into outer and inner passages 22 and 24 where it is used to cool the liners 12 and 14.

Disposed between and interconnecting the outer and inner liners 12 and 14 near their upstream ends is an annular dome plate 30. A plurality of circumferentially spaced swirler assemblies 32 are mounted in dome plate 30. Each swirler assembly 32 receives compressed air from annular opening 28 and fuel from a corresponding fuel tube 34. The fuel and air are swirled and mixed by swirler assemblies 32, and the resulting fuel/air mixture is discharged into combustion chamber 20. The combustor has forward 60 and aft 62 ends and defines a longitudinal axis (not shown), which in the case of an annular combustor is coincident with the longitudinal axis of the engine. It is noted that although FIG. 1 illustrates one preferred embodiment of a single annular combustor, the present invention is equally applicable to any type of combustor, including double annular combustors, which uses multi-hole film cooling.

Outer and inner liners 12 and 14 each comprise a single wall, metal shell having a generally annular and axially extending configuration. Outer liner 12 has a hot side 36 facing the hot combustion gases in combustion chamber 20 and a cold side 38 in contact with the relatively cool air in outer passage 22. Similarly, inner liner 14 has a hot side 40 facing the hot combustion gases in combustion chamber 20 and a cold side 42 in contact with the relatively cool air in inner passage 24. Both liners 12 and 14 include a large number of closely spaced cooling holes 44 formed therein.

Dilution air is primarily introduced into combustor chamber 20 through a plurality of circumferentially spaced dilution holes 48 (FIG. 1) disposed in each of outer and inner liners 12 and 14. Dilution holes 48 are generally far smaller in number than the cooling holes 44, and each dilution hole 48 has a cross-sectional area that is substantially greater than the cross-sectional area of one of the cooling holes 44. Dilution holes 48, and to a smaller extent cooling holes 44, serve to admit dilution air into combustor chamber 20. The dilution holes are arranged in circumferentially extending bands around the periphery of the liners 12 and 14. The forward-most band of dilution holes 48 are referred to as primary dilution holes.

In the assembled combustor, certain ones of the primary dilution holes 48 are aligned with the injection points defined by the circumferential location of the center of the fuel injectors 34 and swirlers 32. In operation, the flow of combustion gases past these circumferential locations create "hot streaks" of locally increased material temperatures. These streaks are not strictly longitudinal; because of the swirl of the flow in the combustor caused by the swirlers 32, the streaks are curved in the circumferential direction when viewed along the length of the combustor. Although the prior art cooling provisions provide adequate cooling for the other portions of the combustor liners 12 and 14, the portions of the combustor liners 12 and 14 subject to hot streaks can exhibit oxidation, corrosion and low cycle fatigue (LCF) failures from field use.

Figure 2:
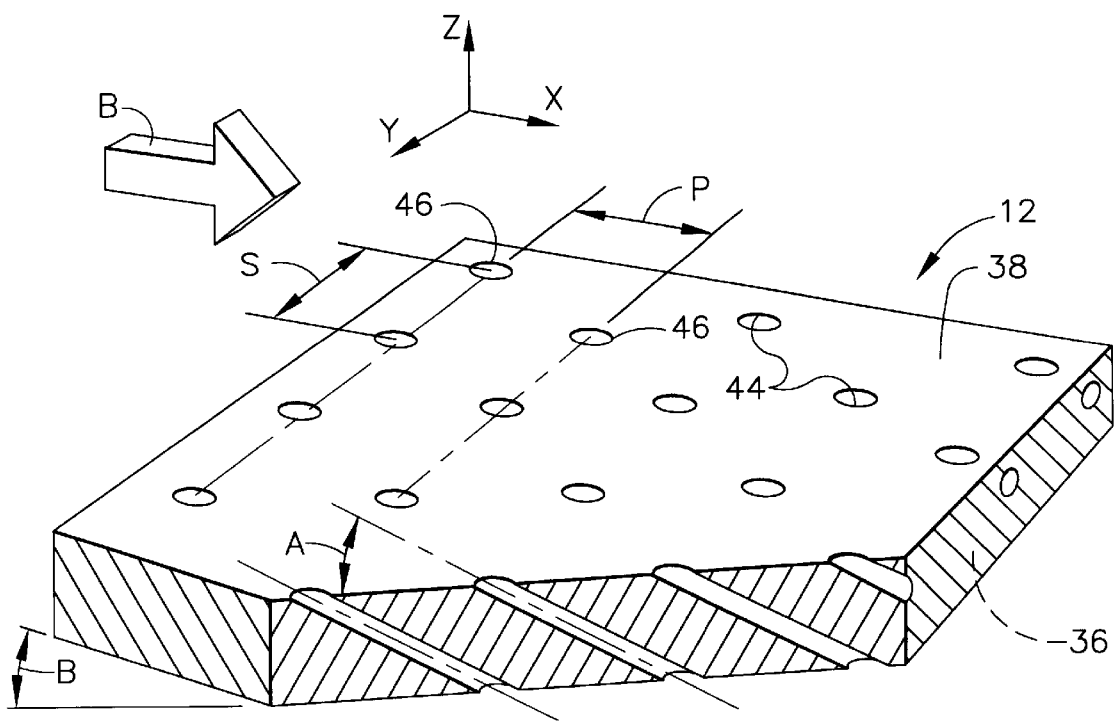
FIG. 2 is a perspective view of a portion of a combustor liner depicting angled multi-hole cooling holes.

Referring now to FIG. 2, cooling holes 44 disposed through a portion of outer liner 12 are shown in more detail. Although FIG. 2 depicts cooling holes in outer liner 12, it should be understood that the configuration of cooling holes of inner liner 14 is substantially identical to that of outer liner 12. As such, the following description will also apply to inner liner 14. FIG. 2 includes a frame of reference having axes labeled X, Y and Z, wherein X is the downstream axial direction of flow (indicated by arrow B) through combustor 10, Y is the circumferential direction, and Z is a radial direction. Cooling holes 44 are axially slanted from cold side 38 to hot side 36 at a downstream angle A, which is preferably in the range of about 15° to 20°. Cooling holes 44 are arranged in a series of circumferentially extending rows 46. Adjacent holes 44 in each row have a circumferential hole spacing S, between their respective centerlines, and adjacent rows 46 have an axial row spacing P.

Figure 3:
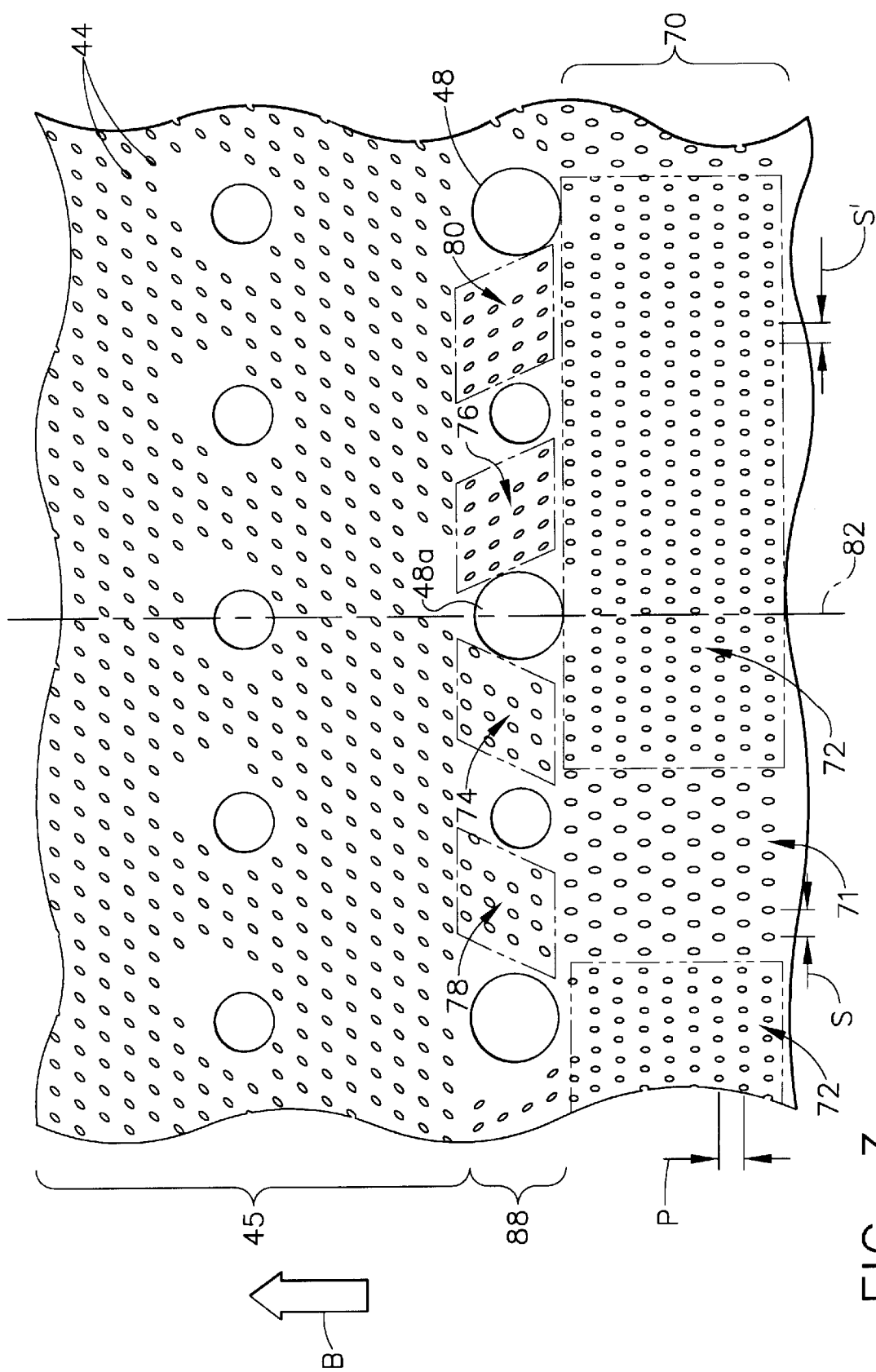
FIG. 3 is a top view of a portion of a combustor liner depicting the arrangement of the multi-hole cooling holes of the present invention.

Referring now to FIG. 3, the cooling holes 44 are arranged into three primary groups: a group 45 located in the area aft of the primary dilution holes 48, another group 70 located in the area forward of the primary dilution holes 48, and another group 88 disposed in the area axially in-line with primary dilution holes 48 (i.e., neither forward nor aft of the primary dilution holes 48). The circumferential location of the nearest cup center is represented by line 82 in FIG. 3. The particular primary dilution hole that is circumferentially aligned with the cup center 82 is identified by reference number 48a.

The group 45 of cooling holes 44 is located aft of the primary dilution holes 48. The cooling holes 44 of this group 70 are angled downstream in a Z direction at an angle A as discussed above. The cooling holes 44 of group 45 may be all of the same diameter and cross-sectional shape in order to ease manufacture. Alternatively, selected ones of the cooling holes 44 may have larger diameters for increased local cooling. The cooling holes 44 of group 45 are also circumferentially slanted or clocked at a clock angle B as shown in FIG. 2. Clock angle B preferably corresponds to the swirl of flow through combustor chamber 20, which is generally in the range of about 30° to 65°. In an exemplary embodiment, angle B may be about 45°.

A group 70 of cooling holes 44 is arranged around the periphery of the liner 12 upstream of the primary dilution holes 48. The cooling holes 44 of this group 70 are angled downstream in a Z direction at an angle A as discussed above. The cooling holes 44 of group 70 may be all of the same diameter and cross-sectional shape in order to ease manufacture. The cooling holes 44 of group 70 may be aligned parallel to the combustor's longitudinal axis in the circumferential direction, or they may be disposed at an angle to the longitudinal axis to better direct the airflow as desired. For example, the cooling holes 44 of group 70 may be circumferentially slanted or clocked at a clock angle B, as shown in FIG. 2 and described above. Group 70 is divided into first and second sub-groups referenced as 71 and 72 respectively. The center-to-center spacing of the cooling holes in the first sub-group 71 is generally equal in the axial and circumferential directions, as described more fully below. The second sub-group 72 of the group 70 of cooling holes 44 is provided to address the hot streaks in the liner 12. The cooling holes 44 of second sub-group 72 are the same diameter as the cooling holes 44 of first sub-group 71, but they are more closely spaced in order to provide more cooling holes 44 per unit area, as described below. This denser pattern of the second sub-group 72 provides increased cooling air flow which is used to reduce the temperature of the sections of the liner 12 subject to hot streaks. In an exemplary embodiment the sub-group 72 is arranged in the form of a rectangle when viewed in a radial direction.

Because of the swirl in the flow through the combustor, the hot streaks are not precisely aligned with the circumferential positions of the cup centers 82 at the forward end 60 of the liner 12. Rather, there is some offset of the hot streaks with respect to the cup centers 82. Therefore, the position of the sub-group 72 is selected to provide enhanced cooling in a particular circumferential location as needed. The center of sub-group 72 may be offset circumferentially from the cup center 82 in the direction of the flow swirl.

Conventionally, cooling holes in typical combustor liners have very small diameters on the scale of about 0.02 inches (0.51 mm) and circumferential hole spacing of about 0.13 inches (3.30 mm), or about 6.5 hole diameters. The axial row spacing is generally equal to the circumferential hole spacing. Specifically, FIG. 3 shows a portion of combustor liner 12 having the sub-group 71 of cooling holes 44 having conventional spacing (i.e., circumferential hole spacing S and axial row spacing P are both about 6.5 hole diameters or 0.13 inches (3.30 mm)) and the sub-group 72 of cooling holes 44 (enclosed by dotted lines in FIG. 3) with a tighter circumferential hole spacing S'. Preferably, cooling holes 44 of sub-group 72 have a diameter of about 0.02 inches (0.51 mm) and a circumferential hole spacing S' of about 4 hole diameters or 0.08 inches (2.03 mm). It is within the scope of the present invention to provide the sub-group 72 with a tighter axial row spacing; however, the axial row spacing P in sub-group 72 is preferably the same as that of sub-group 71. By using the same hole diameter for both sub-group 71 and sub-group 72, machining operations can be performed continually without requiring an additional setup operation.

The cooling holes 44 of group 88 are disposed axially in line with primary dilution holes 48. Within this group 88, sub-groups of cooling holes 44 adjacent to the primary dilution holes 48a aligned with the cup centers 82 are disposed at alternating angles such that the holes on each side of a cup center position are angled towards the primary dilution hole 48a in the circumferential direction. In this way additional cooling flow is provided at the circumferential location of the primary dilution hole 48a. In the exemplary embodiment shown, a first sub-group 74 of cooling holes 44 is located even with primary dilution hole 48a in the longitudinal direction, and is disposed to one side of the primary dilution hole 48a in the circumferential direction. The cooling holes 44 of sub-group 74 are angled in the circumferential direction so that they point towards primary dilution hole 48a in the downstream direction. The cooling holes 44 of sub-group 74 may be angled at about +45° with respect to the longitudinal axis. Another sub-group 76 of cooling holes 44 are located opposite sub-group 74 on the other side of primary dilution hole 48a in the circumferential direction. The cooling holes 44 in sub-group 76 are angled in the circumferential direction opposite to cooling holes 44 in sub-group 74, so that this sub-group 76 also directs cooling air flow to a location directly downstream of primary dilution hole 48a. The cooling holes 44 in sub-group 76 may be angled at about −45° with respect to the longitudinal axis.

Additional sub-groups 78 and 80 of cooling holes 44 may be added to further improve cooling at the cup center position. Again referring to FIG. 3, these additional sub-groups 78 and 80 of cooling holes 44 are the same shape and size as groups 74 and 76, and may be disposed outside of sub-groups 74 and 76 in the circumferential direction, and may be interspersed with additional primary dilution holes 48. In one embodiment, groups of cooling holes 44 may be interspersed with primary dilution holes 48 in alternating order in a circumferential band around the liner 12. The cooling hole sub-groups may be arranged such that alternate pairs of hole sub-groups 74, 78 and 76, 80 are disposed at positive and negative angles with respect to the longitudinal axis, such that each cup center 82 is associated with two pairs of cooling hole sub-groups 74, 78 and 76, 80 arranged to converge downstream of the primary dilution holes 48a. In effect, the pattern of cooling holes as shown in FIG. 3, with four converging sub-groups of cooling holes arranged around primary dilution hole 48a, would be repeated at each cup center 82 around the circumference of the combustor liner 12.

The foregoing has described a multi-hole film cooled combustor liner having an improved arrangement of cooling holes to reduce temperature gradients and hot streaks. While specific embodiments of the present invention have been described, it will be apparent to those skilled in the art that various modifications thereto can be made without departing from the spirit and scope of the invention as defined in the appended claims.

What is claimed is:

1. A gas turbine combustor liner comprising:
   a shell having forward and aft ends and defining a longitudinal axis;
   at least one dilution hole formed in said shell; and
   a group of cooling holes having a diameter substantially smaller than the dilution hole and formed in said shell forward of said dilution hole, said group comprising first and second sub-groups, wherein said cooling holes of said second sub-group are more closely spaced than the cooling holes of said first sub-group of cooling holes, wherein the cooling holes of said second sub-group are disposed in a generally rectangular pattern, the center of said pattern being offset in a circumferential direction from the center of said dilution hole.

2. The combustor liner of claim 1 wherein said shell has an annular configuration and said cooling holes of said first and second sub-groups are all arranged in a series of circumferentially extending rows, wherein adjacent cooling holes in each row have a circumferential hole spacing and adjacent rows have an axial row spacing.

3. The combustor liner of claim 2 wherein the circumferential hole spacing of said second sub-group is less than the circumferential hole spacing of said first sub-group.

4. The combustor liner of claim 3 wherein the cooling holes of said group are parallel to said axis in the circumferential direction.

5. The combustor liner of claim 3 wherein the circumferential hole spacing of said first sub-group is equal to about 6.5 hole diameters.

6. The combustor liner of claim 5 wherein the circumferential hole spacing of said second sub-group is equal to about 5 hole diameters.

* * * * *